United States Patent [19]

Colovas et al.

[11] 3,982,794
[45] Sept. 28, 1976

[54] VELOCITY RATE CHANGE SENSITIVE FLUID VALVE

[75] Inventors: Denny D. Colovas; John S. Logan; Roland L. Mniece, all of Dearborn, Mich.

[73] Assignee: Ford Motor Company, Dearborn, Mich.

[22] Filed: Jan. 7, 1976

[21] Appl. No.: 644,244

[52] U.S. Cl. ............................. 303/24 A; 137/45; 303/10; 303/24 C; 303/71
[51] Int. Cl.² ......................................... B60T 8/093
[58] Field of Search ................. 303/24, 6 C, 71, 10, 303/21 CG; 188/349, 152, 275, 181 A; 137/38, 45, 46

[56] References Cited
UNITED STATES PATENTS

| | | | |
|---|---|---|---|
| 3,377,108 | 4/1968 | Eddy | 303/24 C |
| 3,630,576 | 12/1971 | Sampietro | 303/24 C X |
| 3,888,546 | 6/1975 | Stordahl, Jr. | 303/24 C X |

Primary Examiner—Trygve M. Blix
Assistant Examiner—Douglas C. Butler
Attorney, Agent, or Firm—Robert A. Benziger; Keith L. Zerschling

[57] ABSTRACT

A velocity rate change sensitive fluid valve wherein the valve is comprised of a pendulum member pivotally supported in a reservoir of fluid. The pendulum member is arranged to intercommunicate an input port and an output port with the fluid reservoir upon pendulous movement. The pendulum is supported by a fixed shaft which is ported along its axis to define fluid input and output passages. The pendulum member includes an intercommunicating passage which, upon displacement of the pendulum by a predetermined amount of rotation, as for example by an acceleration or deceleration, will intercommunicate the input and output passages of the support shaft. Fluid flow or fluid pressure may then be communicated through the valve as an acceleration or deceleration indicative signal.

3 Claims, 3 Drawing Figures

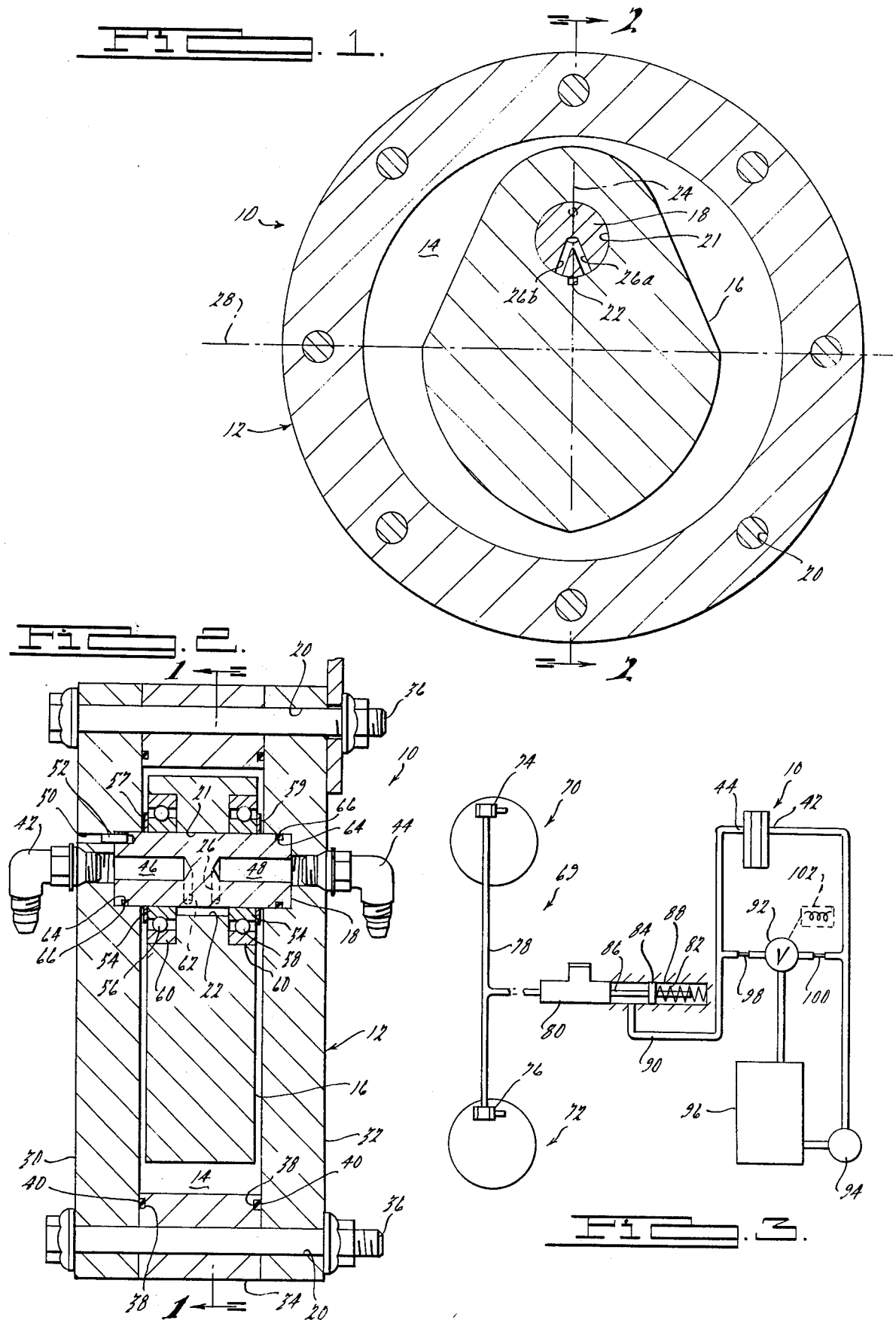

VELOCITY RATE CHANGE SENSITIVE FLUID VALVE

BACKGROUND OF THE INVENTION

1. Field of the Invention

The present invention is directed to the field of fluid control valves and more particularly to that portion of the above-noted field which is concerned with acceleration (or deceleration) sensitive valve structures. As used throughout this specification, "acceleration" is to be understood to include increasing as well as decreasing velocity rate changes. Further, the present invention is directed to that portion of the above-noted field which is concerned with acceleration sensitive valves which may be arranged in a vehicle braking system specifically to sense rates of deceleration in order to modulate the deceleration rate. More particularly still, the present invention is directed to a deceleration rate sensitive valve and a brake system which will apply braking energy to maintain, upon command, a fixed maximum rate of deceleration and which will be fail safe to assure no loss of braking power to an associated vehicle. In light of the foregoing objective, it is a particular object of the instant invention to provide a damped deceleration sensitive valve for use in a vehicle braking system which may be made sensitive to a selected deceleration rate and which does not introduce fluid leakage problems.

2. Description of the Prior Art

It is known in the art to use a pendulum mounted to a rotatable shaft which, upon pendulous movement, will actuate the movable valve member of a fluid control valve. Such valve controls are frequently used in order to modulate fluid pressure or fluid flow in response to a rate of change of velocity with respect to time. Typically, such pendulums are supported in air externally of the valve mechanism. Control problems are known to exist with pendulum controlled fluid valves which respond to a pendulum supported in air.

The principal control problem of such devices is the result of difficulty of precise control of the amount of pendulum displacement. For example, such valves are subject to oscillatory movement under a variety of conditions. If such a valve is used as a fluid control valve, oscillations may cause undesired variations in the fluid control. The oscillations of an air supported pendulum can be of sufficiently great magnitude that fluid control will not be precise. In order to obtain precise fluid control, the undesired oscillations must be damped. Damping the oscillatory motion of a pendulum may be difficult because over-damping will result in slow pendulum response which may be highly undesirable in a fluid control system. Additionally, the movable valve member of such an apparatus provides an additional source of fluid leakage. In order to prevent fluid leakage, additional and expensive valve seals are required. In the event of fluid leakage the amount of control that such a device may provide is a variable.

A further problem with such devices is a result of the friction between the stationary valve components and the movable valve components which exists in any externally controlled valve structure. Since, as is well known, static and dynamic friction levels vary substantially, the action of such a valve as a deceleration control apparatus is such that abrupt changes in the deceleration rate will be generated. In order to reduce static friction, it is frequently the practice to employ very low friction bearings. However, such bearings ordinarily do not provide fluid sealing so that reduction of friction and fluid sealing have been mutually exclusive objectives in the prior art pendulum controlled fluid valves having reasonably low cost. It is therefore an object of the present invention to provide a pendulum actuated fluid control valve having improved fluid sealing and anti-friction characteristics.

It is known in the art that pendulum movement may be damped by way of resilient means or by suspending the pendulum in a fluid medium. While either approach to providing damping for the pendulum movement will substantially improve the predictability and control of valve movement, the aforenoted problems relating to the valve structure would require separate solution and added expense. For example, while it is possible that a substantial portion of the valve problems may be overcome by the use of relatively expensive and exotic sealing techniques, such a solution would unduly increase the cost and complexity of the resulting device without necessarily improving its reliability. It is therefore an object of the present invention to provide a velocity rate change sensitive fluid control valve which is relatively inexpensive and which may be reliable in operation. More specifically, it is an object of the present invention to provide an acceleration sensitive fluid valve which may be used in a vehicle braking system to reliably and safely limit maximum vehicle deceleration. It is also an object of the present invention to provide a fail-safe vehicle braking system utilizing such a valve. It is a further object of the present invention to provide an improved damped pendulum actuated fluid control valve having low friction which is not subject to fluid leakage adjacent relatively moving parts thereof. It is a further and specific object of the present invention to provide such a valve in which all moving parts are completely submerged in the fluid of the system and which does not require the transfer of motion from nonfluid contactive valve components to fluid contacting valve components.

SUMMARY OF THE PRESENT INVENTION

The present invention provides a pendulum controlled fluid valve wherein the pendulum member is rotatably supported by a stationary shaft member having a pair of fluid ports associated with the opposite ends thereof. The pendulum member and its support shaft are received within a fluid tight and fluid filled cavity within the valve housing. The pendulum member is provided with means defining at least one fluid passage which may be displaced upon relative motion of the pendulum with respect to the shaft. The shaft is provided with at least one pair of generally radially directed passages which are arranged to intercommunicate the inlet and outlet ports with the shaft periphery whereby, upon displacement of the pendulum, the pendulum passage may intercommunicate the pair of shaft passages to provide for fluid communication from the inlet port of the shaft to the outlet port of the shaft. Additionally, the shaft supports the pendulum through at least a pair of low friction bearing means with the pendulum having a shaft receiving opening which is sized to closely approximate the outer diameter of the shaft. This provides for a very high resistance fluid leakage path from the inlet port through the outlet port to permit circulation of fluid through the system and particularly to permit the inlet port to fill with fluid the cavity within which the pendulum is supported.

A vehicle brake control system incorporating the instant valve also is provided. The valve operates as a deceleration rate limiting valve in a fluid system used to control vehicle braking. The vehicle brake system includes a master cylinder having resilient means arranged to apply pressure to the master cylinder to accomplish braking. The fluid brake control system is arranged to apply fluid pressure to overcome the effect of the resilient means. To initiate braking, fluid pressure in the control system is reduced. The deceleration rate limiting valve is arranged to reapply fluid pressure when the braking rate exceeds a predetermined value. Any loss of fluid pressure in the control system will cause vehicle braking to be initiated thereby providing a fail-safe control system.

BRIEF DESCRIPTION OF THE DRAWINGS

FIG. 1 illustrates the fluid control valve of the instant invention in a front sectional view taken along section line 1—1 of FIG. 2.

FIG. 2 illustrates the fluid control valve of the instant invention in a side sectional view taken along section line 2—2 of FIG. 1.

FIG. 3 illustrates a fluid controlled vehicle braking system utilizing the valve of FIGS. 1 and 2 as a deceleration rate limiting fluid pressure control valve.

DESCRIPTION OF THE PREFERRED EMBODIMENT

Referring now to the drawing wherein like numbers represent like parts throughout the various views thereof, a velocity rate change sensitive fluid control valve 10 is shown. Valve 10 is comprised of a housing body means 12 defining a fluid cavity 14. Pendulum member 16 is pivotally supported within fluid cavity 14 by shaft member 18. As will become apparent from the discussion which follows, shaft member 18 is fixedly connected to the housing body means 12 and pendulum member 16 is arranged to be pivotal about shaft member 18. As illustrated in FIGS. 1 and 2, the housing body means 12 include a plurality of bolt passages 20 to facilitate assembly of valve member 10.

Pendulum member 16 is illustrated as including a through passage 21 for receipt of shaft member 18. Through passage 21 includes means defining a passage member 22 which is illustrated as being situated along the approximate vertical center line 24 of the pendulum member 16 in close proximity to the outer periphery of shaft member 18. Shaft member 18 is illustrated as including two fluid passages 26a, 26b which extend and diverge approximately radially from the center of shaft 18 on opposite sides of the vertical center line 24. According to FIG. 1, pendulum member 16 is arranged to be symmetrical about the vertical center line 24 and to have a center of gravity which is slightly below the approximate horizontal center line 28 of valve member 10.

Referring now to FIG. 2, the valve member 10 according to FIG. 1 is illustrated in a sectional view taken along the vertical center line 24, section line 2—2 of FIG. 1. Housing body means 12 is comprised of a pair of ported cover plate members 30, 32 and an annular cavity forming member 34. A plurality of bolt means 36 extend through the bolt passages 20 to maintain the housing body means 12 in assembled relation. Annular cavity forming member is provided with a pair of seal receiving grooves 38 which may receive O-ring members 40, as illustrated, in order to define a fluid tight fluid cavity 14. Cover plate member 30 is provided with fluid coupling 42 which, for convenience, may be designated the inlet fluid coupling. Ported cover plate member 32 is provided with a second fluid coupling 44 which, for convenience, may be termed the outlet fluid coupling. Fluid couplings 42, 44 are arranged to communicate with fluid passages 46, 48, respectively of the shaft member 18. Cover plate member 30 is further provided with a pin passage 50 through which is inserted pin member 52. Pin member 52 fixedly interconnects cover plate member 30 with shaft member 18 to prevent the rotation of shaft member 18 with respect to the housing body means 12.

Shaft member 18 supports the inner bearing race 54 of a pair of bearing members 56, 58. The outer bearing race 60 of the bearing members 56, 58 is attached to pendulum member 16. Snap rings 57, 59 retain bearing members 56, 58 on shaft member 18. While the pendulum member 16 is illustrated as being in contactive engagement with the shaft member 18 along the upper, relatively to FIG. 2, surface of shaft member 18 this is only for purposes of illustration. In practice, the outer diameter of shaft member 18 and the diameter of the pendulum passage 21 through which shaft member 18 extends are selected such that a very small gap will exist between shaft member 18 and pendulum member 16 to permit relative to movement of pendulum member 16 with respect to shaft member 18.

As noted with reference to FIG. 1, pendulum member 16 is provided with a fluid passage means 22 which extends along the lower, relative to FIG. 2, surface of shaft member 18. One of the fluid passages 26 is shown (in phantom lines) extending downwardly and rearwardly relative to FIG. 2, from outlet passage 48 generally toward pendulum passage 22. Two similar fluid passages one of which is shown as 62 extend downwardly from inlet fluid passage 46 toward pendulum passage 22. As illustrated in this FIG. 2, shaft member 18 is provided with a pair of seal receiving grooves 64 on opposite ends thereof in which are situated a second pair of O-ring members 66.

Referring now to FIGS. 1 and 2, upon the application of fluid under pressure to inlet fluid coupling 42, fluid will flow through the inlet fluid passage 46 and the second two fluid passages 62. Fluid will then flow around the shaft member 18 and through the bearing members 56, 58 to begin to fill the fluid cavity 14. Fluid will also attempt to flow through the first two passages 26 and to exit from the valve member 10 through outlet fluid passage 48 and outlet fluid coupling 44. However, due to the very close tolerance between the shaft member 18 and the pendulum member 16, the fluid will lose substantially all of its pressure. In the use of the valve member 10 according to the present invention in a deceleration control fluid system for a vehicle brake system, as will be hereinafter described, it would also be a normal expedient to substantially fill fluid cavity 14 with fluid during the assembly of the valve member 10.

In order to provide a valve which is bi-directional in use, the two fluid passages 26 and the two fluid passages 62 are arranged to be angularly displaced by equal angles on each side of the vertical center line 24. This can be conveniently arranged by machining and drilling shaft member 18 with a predetermined angle included between the two fluid passages 26 and the two fluid passages 62. Similarly, shaft member 18 can be provided with an accurately positioned blind passage for receiving pin member 52. The cover plate member 30 can similarly be provided with very accurately positioned pin passage 50. Thus, on assembly, the insertion of pin member 52 through pin passage 50 into the blind pin receiving bore of shaft member 18 will assure that shaft member 18 is nonrotatable with respect to the housing body means 12. This will assure that the two fluid passages 26 and the two fluid passages 62 are accurately positioned with respect to the vertical center line 24 of the valve member 10. The pair of O-ring members 40 and the pair of O-ring members 66 will assure that fluid cavity 14 is a fluid tight cavity and will assure against any leakage of fluid therefrom. In the valve member 10 according to the instant invention, pendulum member 16 with its fluid passage means 22 comprises the rotary member of a conventional valve such that pendulum passage 22 may intercommunicate selected ones of the two fluid passages 26 and the two fluid passages 62. Pendulum member 16 may also be positioned, as illustrated in FIGS. 1 and 2, so that passage means 22 is displaced from the fluid passages 26, 62 so that the two fluid passages 62 can communicate with the two fluid passages 26 only through the fluid restriction presented by the very close tolerance matching of the shaft member 18 with the pendulum member 16. While such a fluid restriction would not prevent fluid from flowing through valve member 10, it will be appreciated that such fluid flow will be from the inlet fluid coupling 42 through the outlet fluid coupling 44 and will thus not represent a loss of fluid to the system. Additionally, in a fluid system which responds to fluid pressure, it will be appreciated that the fluid pressure appearing at inlet fluid coupling 42 will be substantially dissipated and will not appear at outlet fluid coupling 44 due to the very high restriction presented by the tolerance matching.

Referring now to FIG. 3, a fluid control system 68 incorporating the valve 10 according to the present invention is illustrated as controlling a vehicle braking system 69. A pair of vehicle brakes 70, 72 are illustrated as having a pair of brake cylinders 74, 76. The brake cylinders 74, 76 are actuated by fluid pressure transmitted over fluid supply line 78. This fluid pressure is derived from master cylinder 80. Compression spring 82 is arranged to apply pressure to plunger 84 which is connected by actuating rod 86 to the master cylinder 80. Compression spring 82 constantly applies pressure to plunger 84 which pressure may be communicated by actuating rod 86 to master cylinder 80. As thus described, compression spring 82 is operative to actuate the brake cylinders 74, 76 to generate braking energy.

Compression spring 82, plunger 84 and actuating rod 86 are received within fluid tight cylinder 88. Fluid line 90 provides for communication of cylinder 88 on the side of plunger 84 opposite to compression spring 82. Fluid line 90 communicates with outlet fluid coupling 44 of valve member 10. Fluid line 90 also communicates with control valve 92. Control valve 92 may be, for example, a two-way fluid valve actuated mechanically or electromechanically to one of its two positions. Control valve 92 communicates through suitable fluid conduits with fluid pump 94 and fluid reservoir 96. The inlet fluid coupling 42 of valve 10 according to the present invention is also communicated to the fluid pump 94 by way of suitable fluid supply conduits. A pair of fluid restrictions 98, 100 are shown to be situated in the fluid supply line on either side of control valve 92.

In normal operation of the fluid system 68, fluid pump 94 withdraws fluid from reservoir 96 and supplies this fluid under pressure to the control valve 92 and the fluid inlet coupling 42 of valve 10. Control valve 92 may be commanded to its operating position, for example by electric mechanical relay 102. The operating position may be, for example, the position of the control valve 92 corresponding to the release of braking pressure at vehicle brakes 70, 72 as would be necessary to allow normal vehicle travel. In the operating position, relay 102 may command control valve 92 to a position to provide for fluid communication between fluid restriction 98 and 100. Fluid will then be communicated under pressure, with slight pressure loss due to the restrictions, through the fluid line 90 to enter the fluid cylinder 88 behind plunger 84. By properly selecting the pumping pressure of fluid pump 94 and by giving due consideration to the fluid pressure loss produced by fluid restrictions 98, 100, a pumping pressure sufficiently high to overcome the effects of compression spring 82 and to movably bias plunger 84 rightward relative to FIG. 3 may be readily achieved. This biasing of plunger 84 will cause master cylinder 80 to lower the pressure appearing in fluid supply line 78 to release pressure in brake cylinders 74, 76 and to release the vehicle brakes 70, 72. In a situation where it is desired that the vehicle with which fluid system 68 is associated should come to a controlled stop, electrical energy may be removed from relay 102 and control valve 92 will return to its second, or vehicle braking state. For example, this would rotate the valve to provide for direct fluid communication between the fluid restriction 98 and the fluid reservoir 96. With the removal of fluid communication between fluid pump 94 and fluid cylinder 88, the compression spring 82 will begin to apply pressure to the master cylinder 80 to begin to actuate the vehicle brakes 70, 72.

With the fluid valve 10 according to the present invention oriented to have its horizontal center line 28 generally parallel to the direction of travel of the associated vehicle, the application of fluid pressure to brake cylinders 74, 76 will result in the generation of a braking force by vehicle brakes 70, 72. Normal inertia will cause pendulum member 16 to begin to be rotatably displaced relatively to shaft member 18. As pendulum member 16 is displaced from its normal or rest position, the passage means 22 of the pendulum member 16 will begin to approach a condition of providing relatively unrestricted fluid communication between selected ones of the two fluid passages 26 and the two fluid passages 62. This will establish a fluid communication between the inlet coupling 42 and the outlet coupling 44 which will not cause substantial pressure loss. When the braking energy reaches a sufficiently high degree that the pendulum will be displaced to its intended control position, i.e., the position placing the inlet and outlet fluid couplings in fluid communication through passage means 22, fluid pressure will be reapplied to the fluid cylinder 88 through fluid line 90 to limit the application of pressure from compression spring 82 to master cylinder 80. This will limit the degree of braking energy generated by vehicle braking 70, 72. When the vehicle comes to a halt, the pendulum member 16 will assume its normal, downward position, fluid pressure in fluid cylinder 88 will drop and the compression spring 82 will apply full pressure to master cylinder 80 thereby locking the vehicle brakes 70, 72. When it is desired to release the brakes, relay 102 will be actuated to place control valve 92 in its first or normal position and full pressure from fluid pump 94 will be applied to fluid cylinder 88 to cause rightward, relative to FIG. 3, movement of plunger 84 to remove the application of brake initiating energy from master cylinder 80. The system according to FIG. 3 is fail-safe in that any failure of the fluid system 68 will permit spring 82 to apply braking energy to bring the vehicle to a halt and any failure in the control system would appear to valve 92 to be a command to move to its vehicle braking or second state again bringing the vehicle to a stop.

In the application of the fluid valve 10 to a vehicle brake control system 68, the fluid of the system 68 should be selected to have a fluid density which approaches the density of pendulum member 16. Conversely, the pendulum member 16 may be fabricated from a material having a density which approaches the density of the fluid in fluid system 68. The noted density relation is important since the tangent of the angle through which pendulum member 16 will rotate may be expressed by the equation $$\text{Tan } \alpha = \frac{D_P A}{g(D_P - D_0)}$$

wherein the angle $\alpha$ is expressed in degrees, $D_P$ represents the density of the pendulum, $D_0$ represents the density of the fluid, $A$ represents the rate of acceleration and $g$ represents the gravitational constant. For a selected braking rate, the angle $\alpha$ will increase as the difference between the density of the pendulum and the density of the fluid approaches zero. For a fluid valve 10 as illustrated in FIGS. 1 and 2, the angle $\alpha$ is one-half of the angle included between fluid passages 26 and between fluid passages 62. By selection of a fluid/pendulum density differential, the angular rotation of pendulum member 16 with respect to shaft member 18 at a preselected acceleration rate may be established to provide an improved valve sensitivity. It also allows simplification of the manufacture of shaft member 18 since the included angle may be made larger or smaller as desired.

By arranging fluid valve 10 to have its pendulum substantially totally immersed within the fluid of fluid system 68, the motion of pendulum 16 will be constantly damped to prevent oscillations of the pendulum particularly at the intended control position. By substantially filling fluid cavity 14, fluid oscillations are prevented from influencing the position of pendulum 16. Furthermore, by immersing the pendulum in the fluid of fluid system 68, the integrity of fluid system 68 is maintained. Fluid valve 10 is provided with relatively simple and inexpensive seals which are reliable. Furthermore, the seals are not required to withstand relative motion as is the case with prior art valve structure. By surrounding pendulum member 16 with fluid of the fluid system 68, the pendulum can be supported on shaft member 18 through low friction bearing means substantially reducing the friction problems encountered in prior art pendulum controlled fluid valves. Furthermore, the sensitivity of the resulting valve may be increased in that, as the density of pendulum 16 approaches density of the fluid in which the pendulum 16 is immersed, the response of the pendulum to velocity rate changes will be slowed and the angular displacement of the valve may be increased.

We claim:

1. A fluid control valve comprising in combination:
   housing means defining a fluid cavity;
   a shaft member fixedly received by said housing within said fluid cavity;
   first and second fluid passage means extending through at least a portion of said shaft member and arranged to communicate said fluid cavity to the exterior of said housing;
   said first and second fluid passage means having a plurality of passage openings arranged at the surface of said shaft member exposed to the fluid cavity;
   a pendulum member supported within said fluid cavity for pendulous movement about said shaft member;
   means defining a fluid passage extending through at least a portion of said pendulum means;
   said pendulum fluid passage means arranged to cooperate with said plurality of first and second fluid passage means passage openings and operative upon pendulous movement to inter-communicate selected ones of said passage openings whereby fluid communication may be established through the valve.

2. The fluid control valve of claim 1 wherein said pendulum member is selected to have a density which exceeds but closely approaches the density of the fluid within the fluid cavity in use.

3. A fluid system for controlling the application of pressure to a vehicle brake system having a pressure actuated master cylinder comprising in combination:
   means for applying pressure to the master cylinder;
   resilient means operative to apply a pressure bias to said master cylinder pressure applying means;
   a fluid system for applying a counter-bias pressure to said master cylinder pressure applying means to selectively and controllably overcome said resilient means comprising:
   a fluid reservoir;
   a fluid pump means having a fluid inlet communicating with said fluid reservoir and a fluid discharge port;
   a two-position control valve means in fluid communication with said reservoir, said fluid discharge port of said pump means and said master cylinder pressure applying means, operative in a first position to communicate fluid pressure from said pump means to said pressure applying means to overcome said resilient means and operative in a second position to communicate said pressure applying means to said reservoir whereby said resilient means may apply pressure to the master cylinder; and
   deceleration limiting valve means arranged in parallel to said control valve means between said fluid discharge port of said fluid pump means and said pressure applying means operative to sense the deceleration rate of the vehicle and to apply fluid pressure to at least partially overcome the bias of said resilient means to limit the application of the vehicle brakes.

* * * * *